No. 622,451. Patented Apr. 4, 1899.
O. B. DEPUE.
KINETOGRAPHIC CAMERA.
(Application filed Oct. 20, 1898.)
(No Model.) 5 Sheets—Sheet 2.

Witnesses,
D. F. Mann
Frederick F. Goodwin

Inventor,
Oscar B. Depue,
By Offield, Towle & Linthicum
Atty's.

THE NORRIS PETERS CO., PHOTO-LITHO., WASHINGTON, D. C.

No. 622,451. Patented Apr. 4, 1899.
O. B. DEPUE.
KINETOGRAPHIC CAMERA.
(Application filed Oct. 20, 1898.)

(No Model.) 5 Sheets—Sheet 3.

No. 622,451. Patented Apr. 4, 1899.
O. B. DEPUE.
KINETOGRAPHIC CAMERA.
(Application filed Oct. 20, 1898.)

(No Model.) 5 Sheets—Sheet 4.

No. 622,451. Patented Apr. 4, 1899.
O. B. DEPUE.
KINETOGRAPHIC CAMERA.
(Application filed Oct. 20, 1898.)
(No Model.) 5 Sheets—Sheet 5.

Witnesses,
Inventor,
Oscar B. Depue,
By Offield, Towle & Linthicum,
Atty's.

UNITED STATES PATENT OFFICE.

OSCAR B. DEPUE, OF CHICAGO, ILLINOIS.

KINETOGRAPHIC CAMERA.

SPECIFICATION forming part of Letters Patent No. 622,451, dated April 4, 1899.

Application filed October 20, 1898. Serial No. 694,117. (No model.)

*To all whom it may concern:*

Be it known that I, OSCAR B. DEPUE, of Chicago, in the county of Cook and State of Illinois, have invented certain new and useful Improvements in Apparatus for Photographing Objects in Motion and for Projecting Pictures, of which the following is a specification.

This invention relates to apparatus for photographing objects in motion and for projecting the pictures thus produced, or, in other words, to a combined kinetographic and kinetoscopic camera adapted for effective use both in the taking of pictures of moving objects and in the projecting of these pictures upon a screen or suitable surface.

The object of the present invention is to provide an efficient, simple, and easily-manipulated mechanism for producing and controlling the movement of the film and, further, generally to simplify the construction of the operating mechanism; and to these ends the invention consists in certain novel features, which I will now proceed to describe and will then particularly point out in the appended claims.

Figure 1:
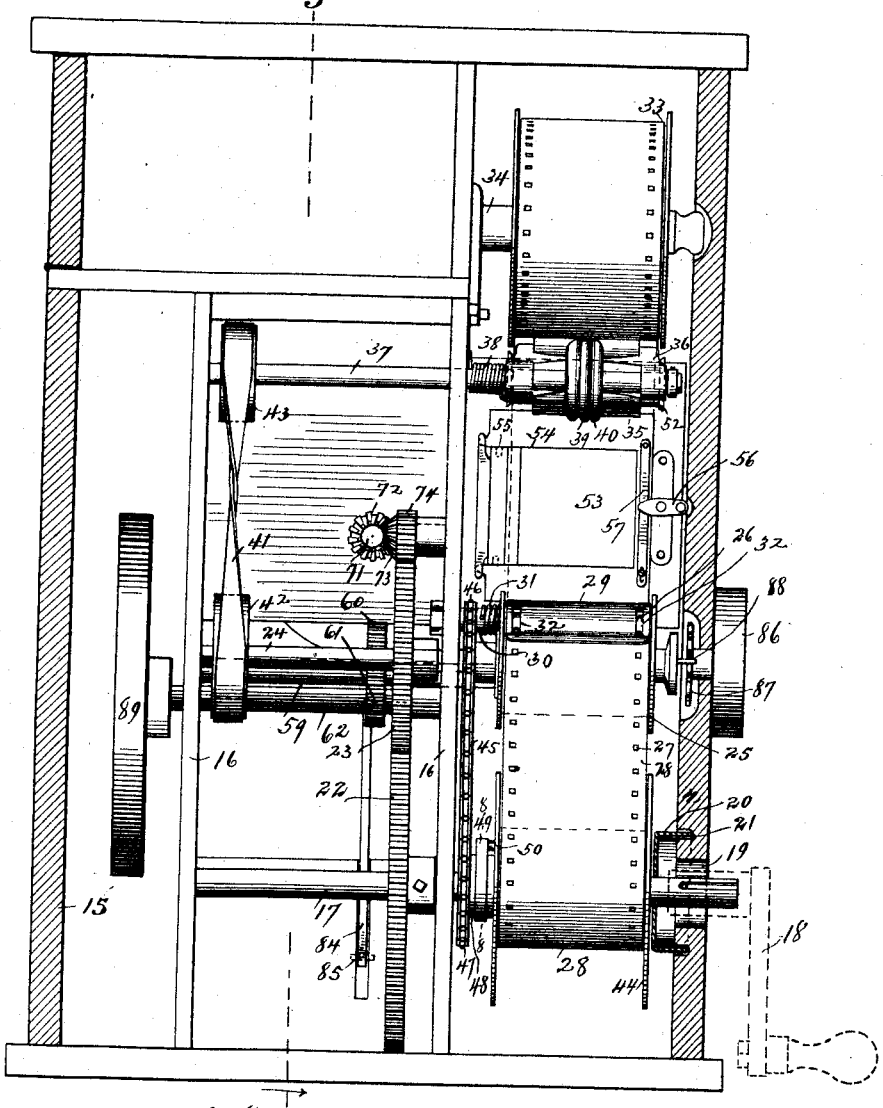
Figure 2:
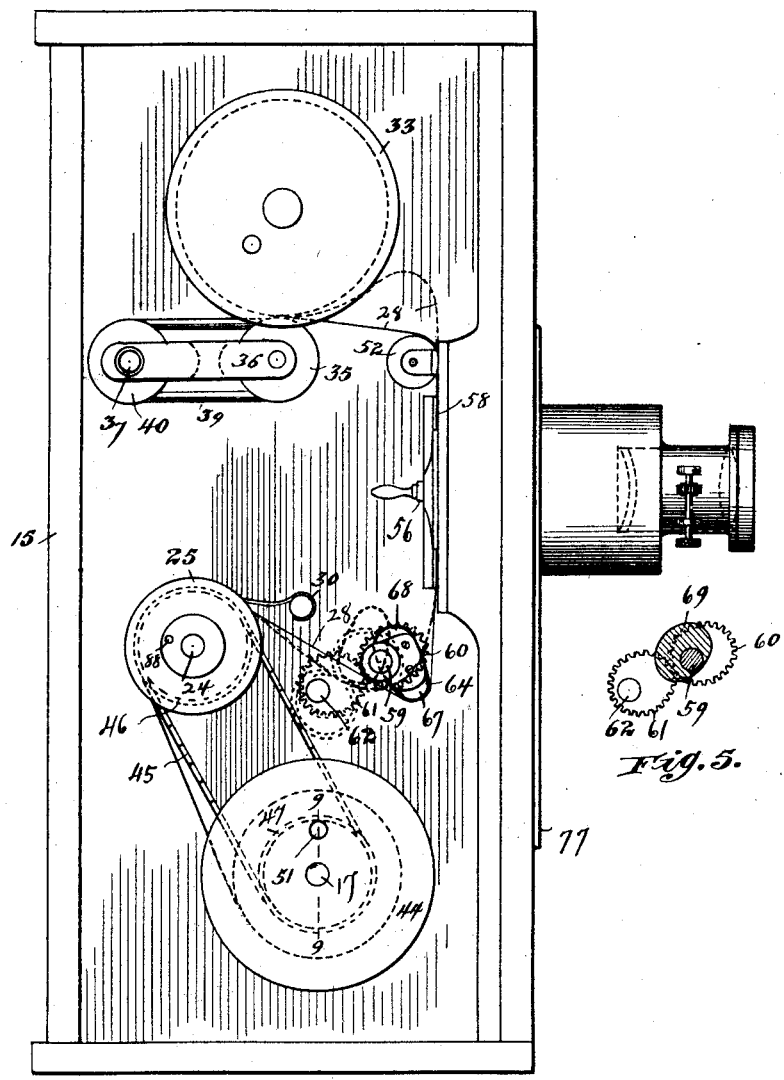
Figure 5:
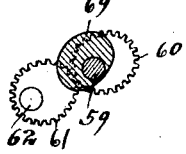
Figure 6:
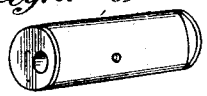
Figure 7:
Figure 3:
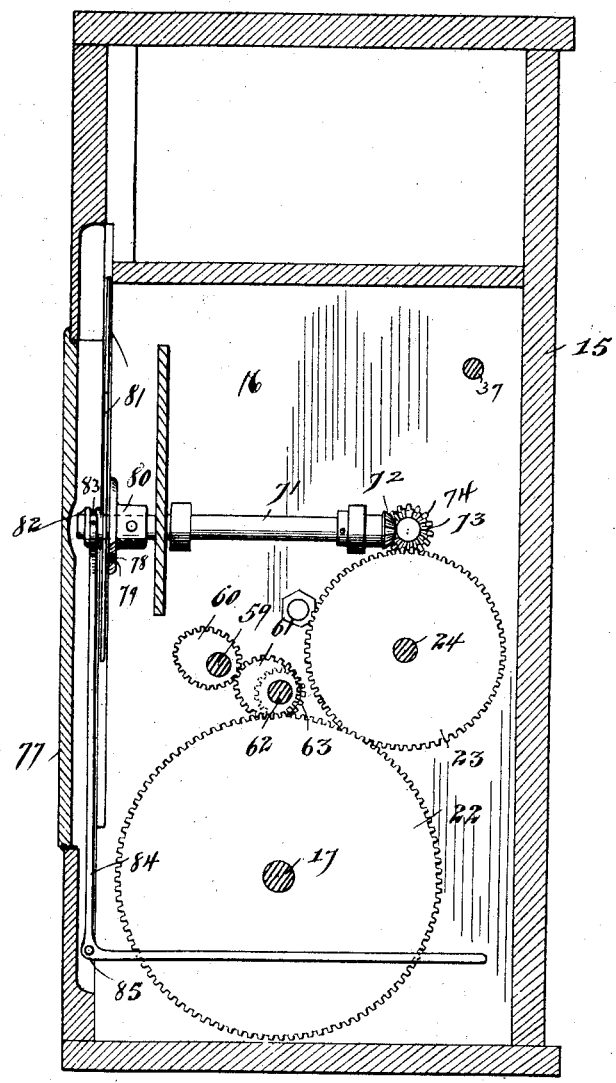
Figure 4:
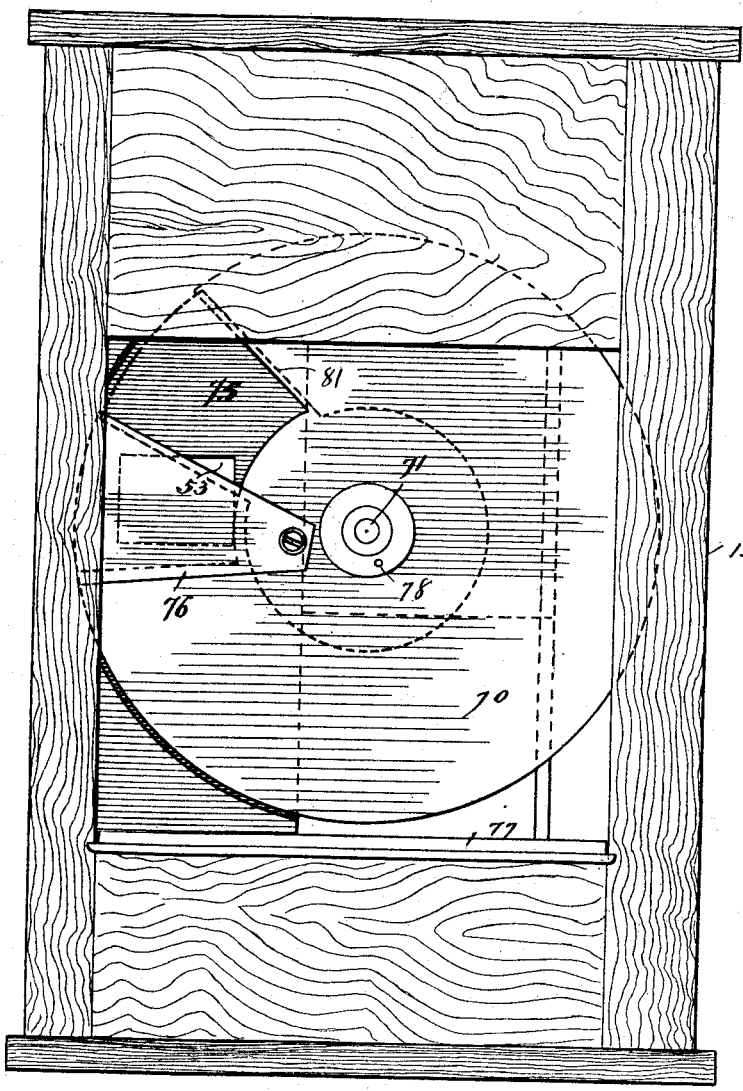
Figure 10:
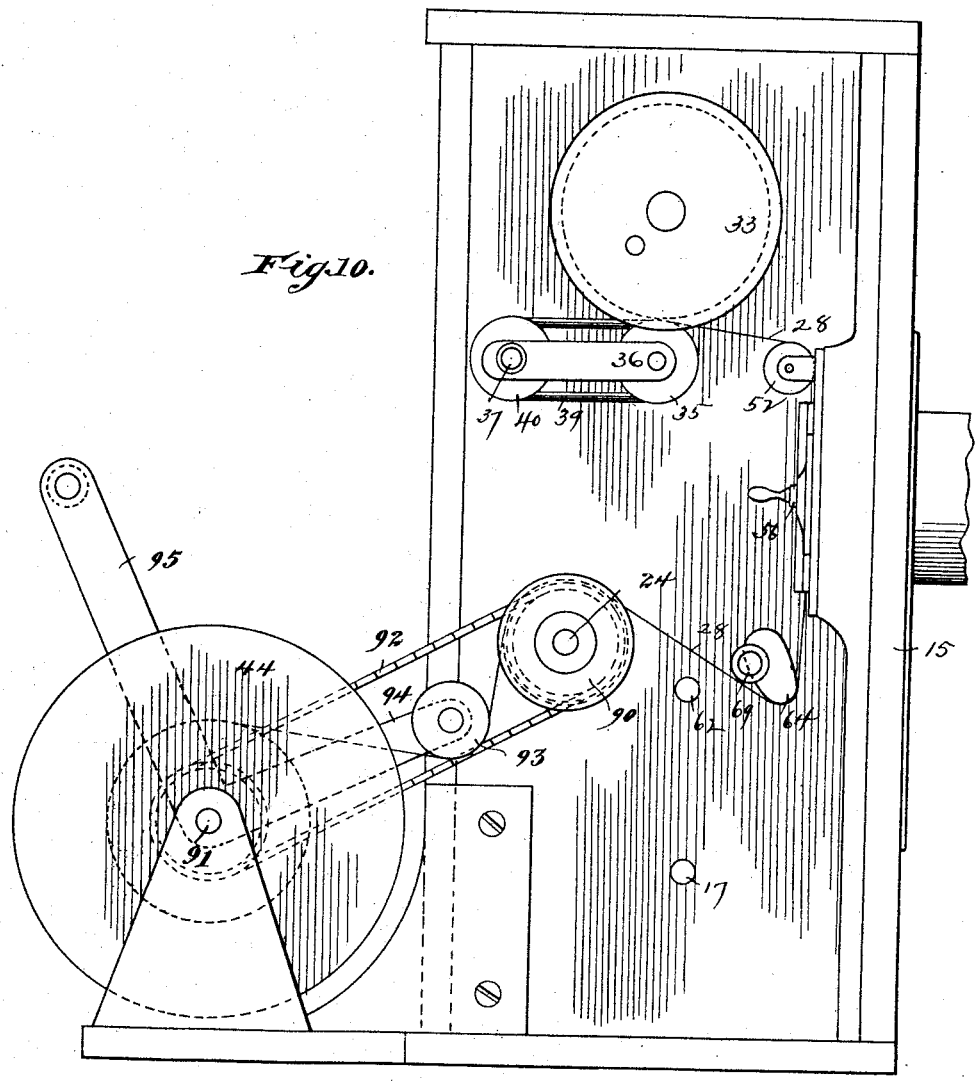

In the accompanying drawings, Figure 1 is a rear elevation, partly in section, of a camera embodying my invention with the rear wall or cover of the case removed. Fig. 2 is a similar view, in side elevation, with the side wall of the casing removed. Fig. 3 is a sectional view, taken on the line 3 3 of Fig. 1, looking in the direction of the arrow. Fig. 4 is a front elevation with the front door or cover open in order to show the interior of the shutter-chamber. Fig. 5 is a diagrammatic view, partly in section, through the eccentric roller employed when the apparatus is used as a kinetograph, illustrating the relative operative positions of said roller and its actuating-gearing. Fig. 6 is a perspective view of said roller. Fig. 7 is a similar view of the eccentric roller employed when the apparatus is used as a kinetoscope. Fig. 8 is a detail sectional view taken on the line 8 8 of Fig. 1. Fig. 9 is a similar view taken on the line 9 9 of Fig. 2; and Fig. 10 is a view similar to Fig. 2, illustrating a modified form of the apparatus.

In the said drawings, 15 indicates a suitable casing adapted to inclose the mechanism and to exclude the light, said casing having upright or vertical partitions 16, which serve to support the various parts of the mechanism.

17 indicates the main or driving shaft, to which power may be applied by means of a detachable crank-handle 18 in order to turn said shaft by hand, the casing being apertured, as shown at 19, to permit the end of the shaft to project in order to receive the crank-handle, and there being provided a light-excluding washer 20, the flange whereof extends into a groove 21 in the wall of the casing. The shaft 17 is provided with a gear-wheel 22, which meshes with a gear-wheel 23 on a shaft 24, which carries the film-feeding roll 25. This latter is provided with sprocket-teeth 26, one series near each end of said roll, to engage with corresponding perforations 27 in the film 28, as is usual in apparatus of this character. In connection with the feed-roll 25 I employ a curved plate 29, pivoted on a pin or axis 30 and having a spring 31, which presses it normally toward the roll 25, against which it holds the film and causes the same to engage positively with the teeth 26. The plate 29 has marginal slots 32 to accommodate the teeth 26. The film is drawn from a drum or spool 33, which is removably mounted on a pin or axis 34 in the upper part of the casing. Motion is imparted to this drum, or, rather, to the roll of film thereon, by means of a roller 35, mounted in a frame 36, pivoted on a shaft 37, said frame being pressed toward the drum 33, so as to hold the roller 35 in contact with the film thereon, by means of a spring 38. Motion is imparted to the roller 35 by means of a belt or endless cord 39, which passes around said roller 35, which is grooved to receive it, and also around a grooved pulley or wheel 40, secured on the shaft 37. The shaft 37 is driven from the shaft 24 by means of a cross-belt 41, passing around a pulley 42 on the shaft 24 and a similar pulley 43 on the shaft 37.

The film is received upon a drum or spool 44, similar to the drum or spool 33, with which it is interchangeable, being mounted loosely and removably upon the outer end of the main shaft 17. Motion is imparted to this drum or spool from the shaft 24 by means of a sprocket-chain 45, which passes over a sprocket-wheel 46 on the shaft 24 and over a similar sprocket-wheel 47 on a sleeve 48, mounted loosely on the shaft 17.

49 indicates a friction-band encircling the sleeve 48 and having a pin 50, which engages an aperture 51 in the drum 44. The friction-band 49 is sufficiently loose upon the sleeve to slip thereon when the resistance of the drum 44 becomes excessive.

The film after being drawn from the drum 33 passes over a guide-roll 52, which is located above an opening 53 in the wall of the casing of the camera, said opening affording a means for exposing a section of the film. The film is held in a flat condition while passing this opening by means of a frame 54, hinged at one side of the opening 53, as indicated at 55, and being pressed against the film when closed by means of a pivoted button 56, which may be projected over a spring 57 on the back of the frame. The surfaces over which the film travels at this point may be covered with felt, plush, or the like, as indicated at 58, for the purpose of preventing the film from being scratched or defaced.

Between the exposure-frame and the feed-roll 25 is located a tension device for imparting an intermittent motion to the portion of the film lying between the spools or drums 33 and 34. This device comprises a shaft 59, to which a variable motion is imparted by the following mechanism: The shaft 59 has located on it an elliptical gear 60, which meshes with a similar elliptical gear 61 on a shaft 62, which is driven from the shaft 17 by means of a pinion 63, which meshes with the gear-wheel 22 on said shaft 17. The shaft 56 is adapted to carry an eccentric roller, around which the film passes and which serves to feed the film intermittently. These rollers are interchangeable, differing somewhat in character, one being employed when the apparatus is used as a projector and the other being substituted when the apparatus is being used for taking photographs. The form of roller employed in projecting is that shown in detail in Fig. 7 of the drawings and in position in Fig. 2 of the drawings, being indicated by the reference-numeral 64. This roller has a longitudinal opening 65, by means of which it may be slipped over the shaft 59, to which it is secured in any suitable manner, as by means of a screw 66. The body of the roller lies practically entirely on one side of the central line of the shaft 59 and has an extension or toe portion 67 of considerable length or eccentricity and a heel portion 68 of less eccentricity. The toe portion 67 is so arranged relatively to the elliptical gear, as will be seen from an inspection of Fig. 2 of the drawings, that it bears to a maximum extent upon the film when the speed of the shaft is greatest. The roller 69, which is shown in detail in Fig. 6 of the drawings and in section in Fig. 5, has considerable less eccentricity than the roller 64, and this eccentricity is so arranged as to bear upon the film to the maximum extent when the speed of the shaft 59 is lowest, as will appear from an inspection of Fig. 5 of the drawings, which illustrates the relative position of the roller 69 to the elliptical gears which drive the shaft 59.

In order to adapt the apparatus for use in the taking of photographs, there is provided at the front of the casing a shutter 70, which is mounted on a shaft 71, provided at its rear end with a beveled pinion 72, which meshes with a corresponding beveled pinion 73, formed in one piece with a spur-pinion 74, which meshes with the gear 23. The shutter 70 has preferably the form of a disk, as shown in Fig. 4 of the drawings, said disk being notched or cut out at its periphery, as indicated at 75, and the size of the notch being controlled by means of a pivoted segment 76, which may be projected to a greater or less extent over the notch 75 for this purpose. The body of the shutter obscures the opening 53, except when the notch 75 passes in front of said opening. The shutter 70 is removable, the casing being provided with a door 77 to give access to the shutter for this purpose, and the shutter is simply slipped over the end of the shaft 71, being provided with a pin 78, which takes into a hole 79 in a collar 80, secured on the shaft 71.

Ordinarily in projecting no shutter is used; but with certain classes of pictures it is found to be sometimes desirable to use a shutter while projecting, and for this purpose I prefer to employ a shutter such as is shown in dotted lines in Fig. 4 of the drawings and in full lines in Fig. 3, said shutter consisting of a radial arm 81 of a width about equal to the notch 75. This shutter may be connected with the collar 80 in the same manner as the shutter 70. I prefer, however, in this construction to provide means for rapidly connecting and disconnecting the shutter 81 from the collar 80, and for this purpose I provide said shutter with a hub 82, having a groove 83, which is engaged by the forked upper end of a lever 84, pivoted at 85 to the casing and extending rearward therefrom to a point where it may readily be operated. It will be at once seen that by means of this lever the shutter may be started and stopped by connecting with or disconnecting it from the collar 80.

I prefer to provide as a desirable adjunct a registering device which will indicate the amount of film which has been fed through the machine, and for this purpose I employ a registering mechanism 86 of any approved construction, mounted on the wall of the casing and having a sprocket-wheel 87, which is adapted to be engaged by an eccentric-pin 88 on the end of the shaft of the feed-roll 25. I also prefer to employ a fly-wheel 89 to give smoothness of motion to the parts, and in the construction shown this fly-wheel is indicated as being mounted upon the shaft 62.

The camera will of course be provided with the usual photographing and projecting lenses, condenser, &c., which are required to equip it for its different uses.

The apparatus thus constructed when employed for projecting operates in the following manner: Motion being imparted to the shaft 17 the film is fed through the machine from the upper drum or spool 33 to the lower one 44. Prior, however, to starting the machine a sufficient amount of film is pulled up between the spool 33 and the guide-roll 52 to form a loop, as indicated in dotted lines in Fig. 2, said loop containing an amount of film equal to at least the extent of film containing one picture and forming one exposure. When the machine is started, therefore, the shaft 59 will rotate until the extremity of its toe 67 bears against the film below the point of exposure, whereupon it will give a rapid downward motion at a very high rate of speed, thereby drawing the film downward, so as to remove the picture exposed at the opening 53 and replace it by the succeeding one. This motion of the film is an exceedingly rapid one owing to the great eccentricity of the toe 67 of the roller 64 and to the fact that this eccentricity operates upon the film when the shaft 59 is at its maximum speed. During the remainder of the rotation of the shaft 59 the roller 64 does not tend to pull the film downward, but leaves it stationary, merely keeping such a tension on it as will hold it taut over the roll 25, which takes up the film which is delivered to it from the roller 64. During this stationary period of the film the roller 35 is feeding forward sufficient film from the upper spool 33 to form a second loop, and at the proper time the film is again drawn down, so as to expose another picture, the roller 35 always providing a surplus to form a loop and prevent the film from being strained or torn by the action of the roller 64. The construction is such that the shifting of the picture is done in a minimum amount of time, thereby materially aiding in the optical effect sought to be produced. As the film is fed forward regularly by the roll 25 and drawn onto the lower spool 44 the roll of film increases in diameter, so that since the spool 44 is driven from the roll 25 the film will be torn unless some compensating movement of one of the parts is provided. This compensation is found in the slipping of the spool 44 relatively to its driving-sleeve 48 by means of the friction-band 49, which connects the two, so that as the roll of film on the spool increases in size the spool will slip to an extent sufficient to maintain a proper movement relatively to the feed-roll 25. By mounting the spool 44 and its driving mechanism loosely upon the main driving-shaft 17 the entire device is made much more compact. The mounting of the roller 35 in the spring-controlled pivoted frame 36 provides an effective means for feeding the film from the upper spool to form the loop, while at the same time permitting ready access to the spool and film and facilitating the removal or replacing of the spool.

When the apparatus is employed for making photographs, the roller 69 is substituted for the roller 64, and its arrangement is such that it gives a required period of rest to the film during the exposure and a comparatively slow movement in changing the film to expose a new portion. The reason for this is that it is immaterial what the rate of movement during the change is providing it is made during the time when the shutter closes the opening 53, and consequently a comparatively slow rate of speed may be employed for this purpose.

The various details of the structure hereinbefore set forth may obviously be varied without departing from the principle of my invention. For instance, the apparatus heretofore described is one which is particularly adapted for use with a film having perforations and a feed-roll having teeth, so as to insure the passage of a given amount of film past the opening 53 at each rotation of the driving-shaft. The machine may, however, be adapted for use with plain films which are not perforated and which not being positively engaged by the feed-roll have a variable movement. Such a construction is shown in Fig. 10 of the drawings. In this construction the toothed feed-roll 25 is dispensed with and a roll 90, which is plain or untoothed, is employed. The lower spool or drum 44 is mounted on a shaft 91, lying rearward of the casing of the instrument, and is positively driven by a sprocket-chain 92 from the shaft 24. The film passing over the roll 90 passes underneath a tension-roller 93, which is mounted on one end of a lever-arm 94, which in turn is loosely mounted on the shaft 91, and has an actuating-handle 95, by means of which the tension on the film may be regulated and the length of the loop between rollers 90 and 93 varied to compensate for the increase in diameter of the roll of film. Moreover, by means of this device the operator by watching the projection of the pictures may, when he observes any variation in the presentation of the sections of the film, control their rate of feed, so as to bring them back to accurate presentation by either pressing the roller harder against the film or relieving the pressure, as the case may be, until the presentation is accurate. When this means of correcting the feed of the film is provided, the positive feed obtained by the toothed feed-roll and perforated film may be dispensed with. Other modifications will readily suggest themselves, and I therefore do not wish to be understood as limiting myself strictly to the precise details of construction hereinbefore described, and shown in the accompanying drawings.

I claim—

1. In an apparatus of the character described, the combination, with means for continuously feeding the film, of means for imparting to a portion of the film an intermittent motion, said means comprising a shaft rotating at a variable speed and carrying an eccentric surface to bear upon the film, substantially as described.

2. In an apparatus of the character described, the combination, with feeding mechanism for imparting to the film a continuous motion, of means for imparting to a portion of the film an intermittent motion, said means comprising a shaft carrying an eccentric surface to bear upon the film, and gearing connecting said shaft with the continuous-feeding mechanism and comprising a pair of elliptical gears, substantially as described.

3. In an apparatus of the character described, the combination, with mechanism for continuously feeding the film, of means for imparting to a portion of the film an intermittent motion, said means comprising a shaft rotating at a variable speed, and a plurality of rollers of varying eccentricity adapted to be substituted for one another on said shaft, substantially as described.

4. In an apparatus of the character described, the combination, with mechanism for continuously feeding the film, of means for imparting to a portion of the film an intermittent motion, said means comprising a shaft rotating at a variable speed, and a plurality of eccentric rollers adapted to be substituted for one another on said shaft with their eccentricities in varying relations to said shaft, substantially as described.

5. In an apparatus of the character described, the combination, with mechanism for continuously feeding the film, of means for imparting to a portion of the film an intermittent motion, said means comprising a shaft and gearing connecting said shaft with the continuous-feeding mechanism and comprising a pair of elliptical gears, and a plurality of eccentric rollers adapted to be substituted for one another on said shaft with their eccentricities in varying positions with relation to the eccentricities of the elliptical gears, substantially as described.

6. In an apparatus of the character described, the combination, with a continuously-rotating feeding-roll for positively engaging and feeding the film, of a receiving-spool for the film, and driving mechanism for said spool comprising a pair of frictionally-engaging elements, whereby the drum or spool may be permitted to slip to vary its rate of rotation with respect to the feed-roll, substantially as described.

7. In an apparatus of the character described, the combination, with a continuously-rotating feed-roll for positively engaging the film, of a drum or spool for receiving the film from said roll, a rotating part driven from said roll, and a friction-band connected with the drum or spool and frictionally engaging said rotating part, substantially as described.

8. In an apparatus of the character described, the combination, with the main driving-shaft, of a continuously-rotating feed-roll for positively engaging the film, connecting mechanism for driving said feed-roll from the main shaft, a drum or spool loosely mounted on said main shaft, a sleeve also loosely mounted on said main shaft, a friction-band embracing said sleeve and connected with the drum or spool, and gearing connecting said sleeve and the feed-roll, substantially as described.

9. In an apparatus of the character described, the combination, with means for imparting an intermittent motion to the film, and a spool or drum from which the film is drawn, said drum being mounted on a fixed shaft, of a feeding mechanism for said spool or drum comprising a rotating shaft, a frame loosely mounted thereon, a feed-roller mounted in the free end of said frame and operatively connected with the rotating shaft, and a spring for forcing said feed-roller toward the drum, whereby said frame may be swung away from said drum when desired, and will be automatically returned to contact with the film thereon when released, substantially as described.

10. In an apparatus of the character described, the combination, with means for intermittently feeding the film, of a spool or drum from which the film is drawn, and a feeding mechanism therefor comprising a rotating shaft having a pulley thereon, a frame loosely mounted on said shaft, a feed-roller in the free end of said frame, a band passing around said pulley and feed-roller, and a spring for normally forcing said feed-roller toward the spool or drum, substantially as described.

11. In an apparatus of the character described, the combination, with mechanism for feeding the film, of a rotating shaft, a shutter mounted on said shaft, and means controlled by the operator for connecting said shutter with and disconnecting it from said shaft, substantially as described.

12. In an apparatus of the character described, the combination, with means for intermittently feeding the film, of a rotating shaft having a collar thereon, a shutter loosely mounted on said shaft and adapted to engage said collar, and a lever having one end engaged with the shutter to move the same toward and from the collar and its other end within convenient reach of the operator, substantially as described.

OSCAR B. DEPUE.

Witnesses:
C. C. LINTHICUM,
FREDERICK C. GOODWIN.